Patented June 22, 1943

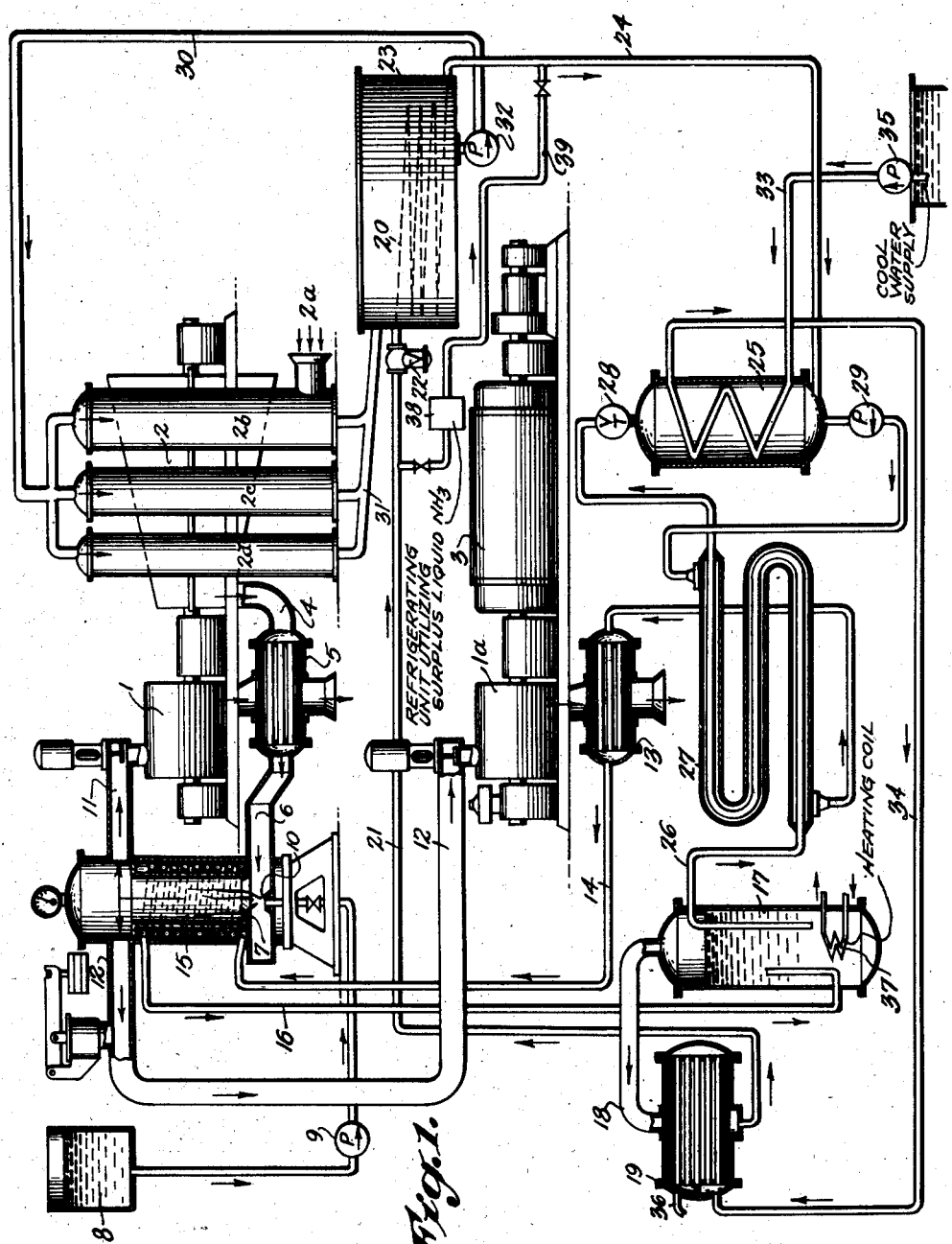

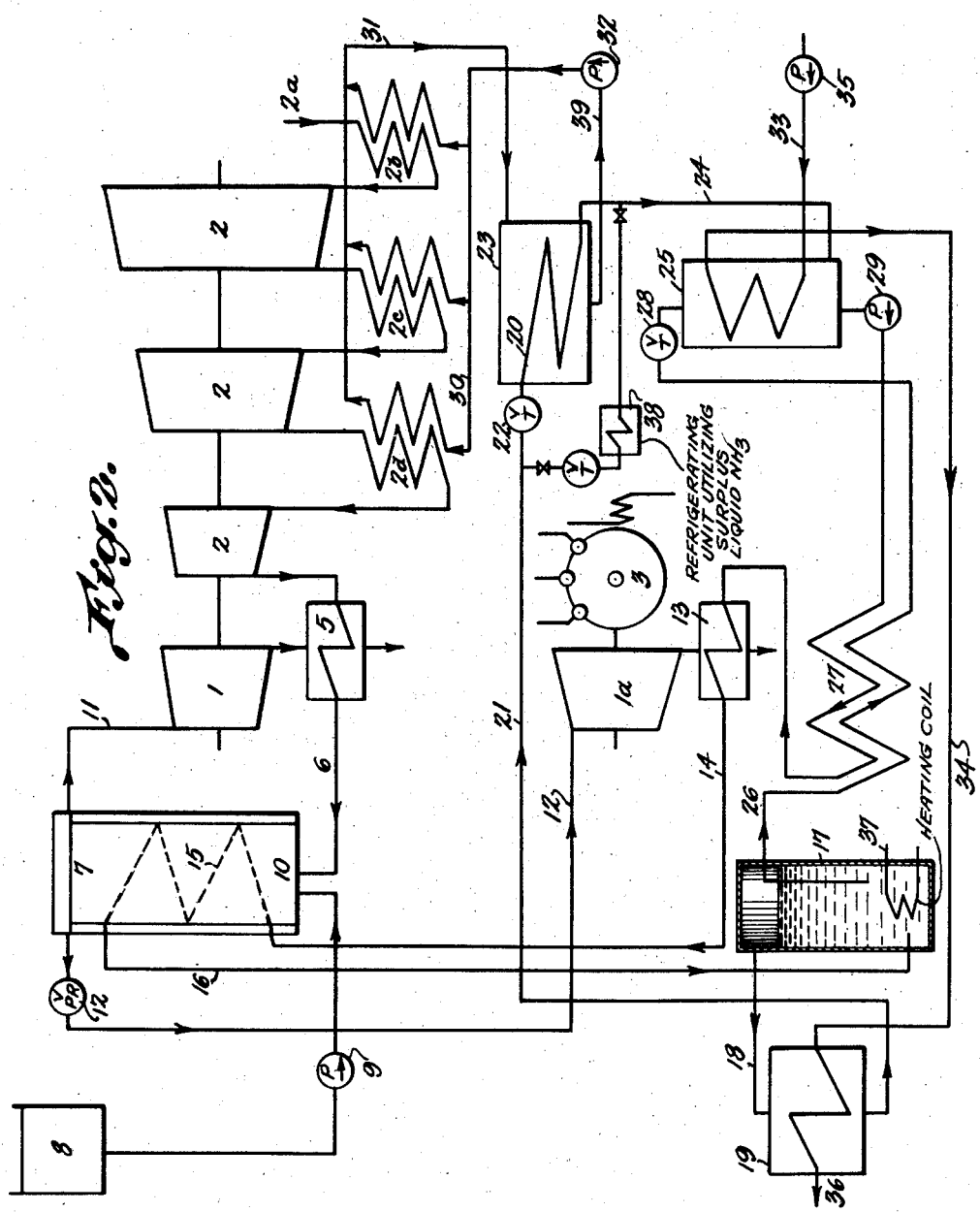

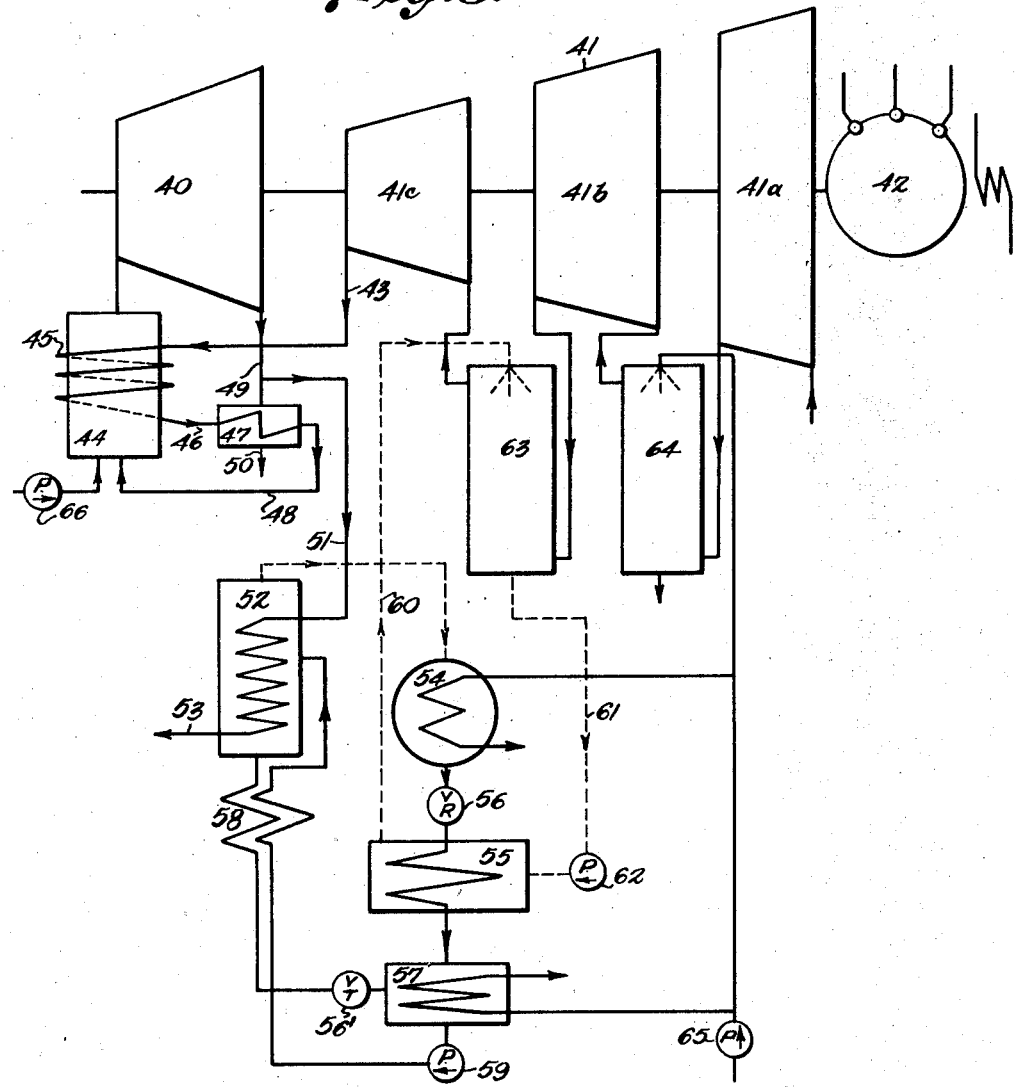

2,322,717

UNITED STATES PATENT OFFICE 2,322,717

APPARATUS FOR COMBUSTION TURBINES

Friedrich Nettel, New York, N. Y.

Application December 15, 1939, Serial No. 309,359
In Japan August 10, 1939

6 Claims. (Cl. 60—41)

This invention relates to combustion turbine apparatus involving the heat cycle to operate the same.

The main object to my invention is to provide apparatus as indicated in order to increase the efficiency of internal combustion turbines by improving the heat cycle thereof.

Another object is to sharply cool the combustion air drawn in by the air pump of the apparatus so that the compression is effected under more favorable conditions than is otherwise usual in the art.

A further object is to recover a great part of the energy of the heat developed by the fuel combustion in the cycle which is ordinarily wasted and lost, by utilizing this heat for artificially cooling the combustion air before and/or during compression.

It is also an object to have a combination of apparatus which will fully and efficiently carry out and exhibit all the salient features and advantages of the invention.

Other objects and the several advantages of my invention will appear more fully in detail as this specification proceeds.

In order to facilitate a ready comprehension of the invention herein and its particular features, drawings are attached hereto in which:

Figure 1 is a layout of the plant for carrying out the invention in practical form;

Figure 2 is a diagrammatic representation of the same plant; while

Figure 3 is a diagrammatic representation of a modified form of plant.

Various attempts have been made to improve the efficiency of internal combustion turbines to the point where such apparatus would be in a position to compete with or even replace other existing types of power plants, but improving the efficiency of the turbine or that of the pumps has been rather disappointing as the improvement obtained has been very trivial at best.

It is known to increase the efficiency of the turbine by increasing the temperature of combustion.

It has also appeared obvious in the art to use the heat of the exhaust gases from combustion turbines for preheating the combustion air delivered by the compressor or pump.

However, these attempts at increasing the efficiency result in excessive temperatures in the combustion chamber of the apparatus and consequently also that of the gases entering the first runner wheel of the turbine above any admissible or safe figure considering the mechanical strength of the turbine blades and it therefore becomes necessary to counteract this excessive rise in temperature by increasing the air surplus to a far higher degree than is necessary for efficient combustion. Such increase of the surplus air introduces a further disadvantage in that a proportional increase of power consumption in the compressor occurs with corresponding decrease in over-all efficiency. The limitations thus obviously imposed on the air preheating leaves the heat of the exhaust gases unutilized to a large degree which is therefore a sheer waste.

In the present invention it is proposed to improve the heat cycle from an entirely new angle which at once avoids any and all disadvantages and introduces a new group of advantages which contributes to a remarkable degree in a vast increase of the efficiency beyond that heretofore obtained by cooling the combustion air, prior to and/or during the compression to temperatures below those obtainable by naturally available cooling media like air, water, ice, etc. It is elementary that a fluid being cooled will not have its temperature reduced to the temperature of the cooling medium unless infinite quantities of the cooling medium are used. It is also proposed in the invention to supply partly or wholly the energy and/or heat input of the apparatus used for artificial cooling directly or indirectly by the combustion turbine and/or the heat contained in the exhaust gases of the combustion turbine.

Hence, in the practical execution of my invention, as shown in a non-limiting example in Fig. 1, an internal combustion turbine plant for power generation primarily includes two internal combustion turbines 1 and 1a. Turbine 1 is coupled to a turbo compressor 2, while turbine 1a is coupled to an electric generator 3. Combustion air is drawn through intake 2a into pre-compression cooler 2b and then in alternation through stages of compressor 2 and interstage coolers 2c and 2d and is discharged through pipe 4 into a surface type heat exchange apparatus 5 whence it passes through a pipe 6 to a combustion chamber 7.

A fuel tank 8 supplies liquid fuel to a fuel pump 9 which forces the fuel to a burner nozzle 10 within the combustion chamber so that, upon igniting the fuel issuing from said nozzle, a constant flame is formed and maintained in said combustion chamber. The combustion gases thus produced leave the combustion chamber through the two pipes 11 and 12, which lead the exhaust gases to the inlet nozzles of the combustion turbines 1 and 1a, respectively, in which they expand to a pressure near that of the atmosphere producing mechanical work available for driving the compressor 2 and electric generator 3, respectively.

The exhaust gases from turbine 1 are utilized for heating the compressed air passing through the surface type heat exchanger 5 from which latter device they escape to the atmosphere. The exhaust gases from the other turbine 1a are utilized in a similar fashion in a heat exchanger 13, the purpose of which will presently appear.

For effecting the refrigeration cooling in coolers 2b, 2c, 2d, an absorption type refrigeration machine is provided, using ammonia liquor or any other suitable fluid.

The rich ammonia liquor is heated by the exhaust gases of turbine 1a in heat exchanger 13, whence it flows through pipe 14 to a pipe coil 15 surrounding the combustion chamber 7, where the flowing liquor is further heated. The liquor leaves the coil by a pipe 16 and discharges into a tank 17 in which ammonia vapor is flashed from the liquor. Pipe 18 conducts the ammonia vapor from the tank 17 to a vapor condenser 19 in which liquid ammonia is formed and passed thence to an evaporator coil 20 through a pipe 21 controlled by a throttle valve 22. The evaporator coil 20 is submerged in brine within a tank 23, and the ammonia vapor leaves coil 20 by a pipe 24 and flows into an absorber 25.

The weak ammonia liquor is withdrawn from tank 17 by a pipe 26 and flows through a heat exchanger 27 and beyond the latter enters the absorber 25 via a throttle valve 28. The ammonia liquor circulating pump 29 forces the liquor from the absorber through the heat exchangers 27 and 13 and through heating coil 15 into tank 17.

The brine contained in tank 23 is kept in constant circulation through a pipe 30, coolers 2b, 2c, 2d, and a return pipe 31 by a brine circulating pump 32. The cooling water requirements of the absorber 25 and condenser 19 are supplied through pipes 33 and 34 by a water pump 35 and the water is discharged from the condenser 19 at 36.

If the heat supplied to the tank 17 as derived from the exhaust gases and/or by the cooling of the combustion chamber, or other parts of the plant should prove insufficient for producing the desired refrigeration effect, an additional heat source in the form of a heating coil 37.

In case, however, surplus refrigeration effects are available after providing for the desired air cooling, other external apparatus 38 for cooling materials for other uses may be supplied with surplus liquid ammonia by connection to pipe 21, the ammonia vapor is returned to the main circuit in pipe 24 by a pipe 39. Of course, this apparatus 38 may be disconnected or omitted altogether, this being also true of the heating coil 37.

From the foregoing, it is quite evident that the combustion air by being artificially cooled to low temperatures prior to and/or during compression is compressed with a minimum expenditure of energy, because this energy is proportional to the absolute temperature of the air (or gas) prior to the compression. Since this well known law of physics applies to any part of the compression process, the inter-coolers reduce the power required in the same way in following compressor stages. The air delivered by the compressor is either not preheated or only moderately preheated by the exhaust from turbine 1 and therefore enters the combustion chamber at a lower temperature than is usual in the art. Consequently, the combustion starts from a lower temperature level and, with the combustion temperature limited as already mentioned by the materials available for turbine blades, the air surplus can be reduced below the figure ordinarily necessary when air preheating alone is used to recover some portion of the heat of the exhaust gases.

Due to the fact that the air actually used is smaller in quantity than usual, and that this smaller quantity of air is vastly reduced in volume by the novel cooling according to the invention, the following additional advantages of design result in the apparatus, aside from the greatly improved heat cycle:

1. Reduced size of compressor due to reduced specific air volume.
2. Reduced number of stages of compressor for a given compression ratio, due to increased air density.
3. Increase of internal efficiency, due to smaller internal leakage and friction.
4. Substantially complete drying of the combustion air (or gas) due to condensation of all moisture during cooling of the air, thus practically avoiding all danger of corrosion in air heaters or other heat exchangers arranged after the combustion turbine.

It is further obvious that the efficiency of the heat cycle according to the invention increases with the compression ratio selected, and with the increase of the permissible temperature of the combustion gases at the inlet to the fast runner wheel of the turbine. It is likewise feasible to employ any known type of refrigeration apparatus, whether it be of the absorption, resorption, or compression type, single or multi-stage.

An example of the many modifications of the invention which are possible, is shown in diagrammatic form in Fig. 3, in which the combustion turbine 40 is coupled to an air compressor 41 consisting of part compressors 41a, 41b, 41c and drives an electric generator 42. The compressed air pipe 43 conducts the combustion air from the compressor 41c to a combustion chamber 44, to which fuel is supplied by pump 66, via the air preheater coil 45. Thence the air proceeds through pipe 46 to an air preheater 47 where the air is further preheated by part of the exhaust gases escaping from the turbine 40. From the air preheater 47, the air flows to combustion chamber 44 through pipe 48. This part of the exhaust gases issues from the air preheater 47 to the atmosphere through pipe 50. From the exhaust pipe 49 another pipe 51 is branched off and leads the remaining portion of the exhaust gases to the ammonia vapor generator 52 of an absorption refrigeration system hereafter briefly referred to by the abbreviation A. R. S. The latter portion of the exhaust gases issues from the vapor generators 52 through pipe 53 to the atmosphere. In the A. R. S. condenser 54 liquid ammonia is formed which flows via a reducing valve 56 to the A. R. S. evaporator coil 55, thence to the associated absorber 57.

The weak ammonia liquor leaves vapor generator 52 by way of a heat exchanger 58 of the A. R. S. and a throttle valve 58′, while the strong ammonia liquor formed in absorber 57 leaves the latter and is forced through heat exchanger 58 back into the vapor generator 52 by an ammonia circulating pump 59. The evaporator coil 55 is submerged in brine which is kept in circulation through pipe 60, spray cooler 63 and return pipe 61 by means of a brine circulating pump 62. While in the spray cooler 63 brine from the A. R. S. is used as the cooling medium, water from any available source is used as the cooling medium in the first stage inter-cooler 64, being supplied by pump 65. The same pump supplies the necessary cooling water to the condenser 54 and absorber 57 of the A. R. S. The cooling water after passing through the apparatus 64, 54 and 57 is allowed to discharge from the system, or is recooled and recirculated.

While in the examples shown and described, power generation was considered, the invention will also serve to generate mechanical power for any purpose, in stationary plants and in vehicles used on road, rail, water and air, using fuels of any kind, gaseous, liquid, solid, or solidified.

It has been demonstrated herein that definite cooling and preferably artificial refrigeration of the combustion air fed to the compressor so that this cooling occurs prior to and/or during the compression introduces an entirely new conception and range of efficiency in the output of an internal combustion turbine plant than heretofore obtained. The actual temperatures involved while broadly stated may be more specifically set forth by stating that it is always desirable to cool the combustion air prior to and/or during compression to a low temperature which ranges from about 5° C. downwardly toward absolute zero, which may be practically attainable by any convenient manner by artificial refrigeration.

Manifestly, variations may be resorted to, equivalents of parts introduced, and parts may be used without others within the broad scope of the invention and its features.

Having now fully described my invention, I claim:

1. A power system, comprising means for combusting fuel, a turbine connected to be driven by the gases of combustion from said combustion means, means to compress in a plurality of stages air to support combustion of said fuel, means to cool said air before the first said compression stage and between each two said stages, heat exchange means to transfer at least a portion of the rejected heat from said turbine to preheat said air after the final compression stage and before introducing said air into said combustion means and absorption refrigerating means utilizing at least a portion of the rejected heat from said turbine to supply a refrigerating medium at low temperature to said air cooling means.

2. A power system, comprising means for combusting fuel, a turbine connected to be driven by the gases of combustion from said combustion means, means to compress air to support combustion of said fuel, means to cool said air before said compression, heat exchange means to transfer at least a portion of the rejected heat from said turbine to preheat said air after compression and before introducing said air into said combustion means and refrigerating means utilizing at least a portion of the rejected heat from said turbine to supply a refrigerating medium at low temperature to said air cooling means.

3. In a power system comprising a compressor for compressing air, a combustion chamber for burning fuel in said compressed air to heat it, a turbine driven by the expansion of the resulting compressed and heated gaseous medium, means to cool said air prior to compression, and refrigeration means utilizing a portion of the waste heat contained in the gaseous medium discharged from said turbine to supply a refrigeration medium at low temperature for said cooling of the air.

4. In a power system comprising a compressor for compressing air, a combustion chamber for burning fuel in said compressed air to heat it, a turbine driven by the expansion of the resulting compressed and heated gaseous medium, means to cool said air prior to compression and to intercool it between two stages of compression, and refrigeration means utilizing a portion of the waste heat contained in the gaseous medium discharged from said turbine to supply a refrigeration medium at low temperature for said precooling and intercooling of the air.

5. In a power system comprising a compressor for compressing air, a heat exchanger for partly heating it indirectly by a portion of the waste heat contained in the gaseous medium discharged from a gas turbine, a combustion chamber for directly heating the air further by burning fuel in said air, and a gas turbine driven by expansion of the resulting compressed and heated gaseous medium, means to cool said air prior to compression, and refrigeration means utilizing a portion of the waste heat of the gaseous medium discharged from said turbine to supply a refrigeration medium at low temperature for said precooling of the air.

6. In a power system comprising a compressor for compressing air, a heat exchanger for partly heating it indirectly by a portion of the waste heat contained in the gaseous medium discharged from a gas turbine, a combustion chamber for heating the air further by burning fuel in said compressed air, and a gas turbine driven by expansion of the resulting compressed and heated gaseous medium, means to cool said air prior to compression and to intercool it between two stages of compression, and refrigeration means utilizing a portion of the waste heat contained in the gaseous medium discharged from said heat exchanger to supply a refrigeration medium at low temperature for said precooling and intercooling of the air.

FRIEDRICH NETTEL.